United States Patent
Takashima

(10) Patent No.: US 10,496,264 B2
(45) Date of Patent: Dec. 3, 2019

(54) OBJECT ADJUSTMENT TOOL AND OBJECT ADJUSTMENT PROGRAM

(71) Applicant: Mitsubishi Electric Corporation, Tokyo (JP)

(72) Inventor: Tetsuya Takashima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 89 days.

(21) Appl. No.: 15/563,001

(22) PCT Filed: Apr. 3, 2015

(86) PCT No.: PCT/JP2015/060675
§ 371 (c)(1),
(2) Date: Sep. 29, 2017

(87) PCT Pub. No.: WO2016/157540
PCT Pub. Date: Oct. 6, 2016

(65) Prior Publication Data
US 2018/0364897 A1 Dec. 20, 2018

(51) Int. Cl.
*G06F 17/00* (2019.01)
*G06F 3/00* (2006.01)
(Continued)

(52) U.S. Cl.
CPC .......... *G06F 3/04847* (2013.01); *G06F 3/048* (2013.01); *G06F 9/44505* (2013.01); *G06F 9/451* (2018.02)

(58) Field of Classification Search
CPC ............... G06F 3/0482; G06F 9/451
(Continued)

(56) References Cited

U.S. PATENT DOCUMENTS 6,292,803 B1 * 9/2001 Richardson ........... G06F 16/252
707/610
6,828,963 B1 * 12/2004 Rappoport .............. G06F 16/29
345/419
(Continued)

FOREIGN PATENT DOCUMENTS

JP 5-233185 A 9/1993
JP 7-072978 A 3/1995
(Continued)

OTHER PUBLICATIONS

International Search Report for PCT/JP2015/060675, dated Jun. 16, 2015.

*Primary Examiner* — Manglesh M Patel
(74) *Attorney, Agent, or Firm* — Sughrue Mion, PLLC; Richard C. Turner

(57) ABSTRACT

An object adjustment tool includes a comparison processing unit to determine whether setting information to be compared of adjustment reference object and setting information to be compared of adjustment target object coincide as a first determination, determine whether setting information to be adjusted of adjustment reference object and setting information to be adjusted of adjustment target object coincide as a second determination, and output determination results to a list, an adjustment processing unit to adjust, when the result of the first determination is a coincidence and the result of the second determination is not a coincidence, the setting information to be adjusted of the adjustment target object to coincide with the setting information to be adjusted of the adjustment reference object, and an expanding unit to overwrite screen data with the setting information to be adjusted of the adjusted adjustment target object.

6 Claims, 8 Drawing Sheets

(51) Int. Cl.
   *G06F 3/0484* (2013.01)
   *G06F 3/048* (2013.01)
   *G06F 9/445* (2018.01)
   *G06F 9/451* (2018.01)

(58) Field of Classification Search
   USPC .................................................. 715/762, 200
   See application file for complete search history.

(56) References Cited

U.S. PATENT DOCUMENTS

| | | | |
|---|---|---|---|
| 9,349,076 B1* | 5/2016 | Liu | G06K 9/6256 |
| 2011/0069892 A1* | 3/2011 | Tsai | G06K 9/3241 |
| | | | 382/218 |
| 2014/0270540 A1* | 9/2014 | Spector | G06T 7/60 |
| | | | 382/199 |

FOREIGN PATENT DOCUMENTS

| | | |
|---|---|---|
| JP | 11-272872 A | 10/1999 |
| JP | 2010-128735 A | 6/2010 |
| JP | 2010-176275 A | 8/2010 |
| JP | 2013-004051 A | 1/2013 |
| JP | 2013-020416 A | 1/2013 |
| JP | 2013-065274 A | 4/2013 |
| JP | 2014-029630 A | 2/2014 |

* cited by examiner

OBJECT ADJUSTMENT TOOL AND OBJECT ADJUSTMENT PROGRAM

CROSS REFERENCE TO RELATED APPLICATIONS

This application is a National Stage of International Application No. PCT/JP2015/060675 filed Apr. 3, 2015, the contents of all of which are incorporated herein by reference in their entirety.

FIELD

The present invention relates to an object adjustment tool and an object adjustment program for automatically adjusting display states of objects displayed on a plurality of screens.

BACKGROUND

In the FA (Factory Automation) field, a programmable display having a function of connecting the programmable display to a control apparatus and displaying information concerning the control apparatus and a function of performing setting for the control apparatus is used. The programmable display includes a touch panel monitor having a user interface function. A user sets, using drawing software for creating screen data, positions and sizes of objects such as switches displayed on the programmable display. The user can further set, using the drawing software, functions realized by the switches on the programmable display.

There are a large number of screens displayed on the programmable display. A plurality of screens sometimes have similar functions or the same layout. When the screen data is created using the drawing software, in particular, if the number of screens is large, in some case, creation work is shared by a plurality of people or screen data in the past is diverted to create the screen data. In this case, a problem sometimes occurs in that the positions of objects slightly shift in screen data for a plurality of pages or a part of creators mistakes color designation of the objects and a color of the same object varies.

When such a deficiency in drawing occurs, the user checks positions, sizes, and functions of the objects one by one or corrects, with a manual input of the user, the deficiency using a tool including a list of positions, sizes, and functions of the objects. For example, when screen data with the number of screens of 100 pages is created but there are a plurality of screen data created in specifications of the same layout, an operator needs to manually check whether coordinates of the same object are unified among the screen data created in the specifications of the same layout and correct the coordinates one by one.

Further, when there are a plurality of project data, which are data of a collection of screen data of each programmable display, it is necessary to check each of the project data and correct screen data in the respective project data. For example, when similar screen data are created by a plurality of programmable displays, it is necessary to execute the same work on the respective project data. When a layout of a certain object is changed in one project data, if it is desired to set the same object of the other project data to the same layout, concerning the other project data, the operator needs to manually perform editing same as editing of one project data.

CITATION LIST

Patent Literature

Patent Literature 1: Japanese Patent Application Laid-Open No. 2010-128735

SUMMARY

Technical Problem

For example, Patent Literature 1 relates to drawing software of a programmable display and discloses that the position of a component image arranged anew is changed to a proper position on the basis of arrangement positions of component images of already-created screen data. In this technology, the already-created screen data is set as a reference and a guide conforming to the reference is displayed during data creation to make creation of screen data by a user efficient.

However, work itself according to the guide is manual. When already-created data is changed, the data needs to be manually changed. That is, the technology included in the conventional drawing software of the programmable display does not have a function of automatically adjusting setting information such as a layout and a color of the same object among a plurality of screen data or among a plurality of project data.

The present invention has been devised in view of the above and an object of the present invention is to obtain an object adjustment tool capable of automatically adjusting setting information of objects of already-created screen data.

Solution to Problem

To solve the problems and achieve the object, an object adjustment tool according to the present invention includes: a setting-screen display unit to display a setting screen for receiving an adjustment target object included in screen data and serving as a target of adjustment, an adjustment reference object included in the screen data and serving as a reference of the adjustment, setting information to be adjusted, and setting information to be compared; and a comparison processing unit to determine whether the setting information to be compared of the adjustment reference object and the setting information to be compared of the adjustment target object coincide, determine whether the setting information to be adjusted of the adjustment reference object and the setting information to be adjusted of the adjustment target object coincide, and output a determination result to a determination result list. The object adjustment tool according to the present invention further includes: an adjustment processing unit to adjust, when the setting information to be compared of the adjustment reference object and the setting information to be compared of the adjustment target object coincide and the setting information to be adjusted of the adjustment reference object and the setting information to be adjusted of the adjustment target object do not coincide on the basis of the determination result list, the setting information to be adjusted of the adjustment target object to coincide with the setting information to be adjusted of the adjustment reference object; and an expanding unit to overwrite the screen data including the adjustment target object with the setting information to be adjusted of the adjustment target object adjusted by the adjustment processing unit.

Advantageous Effects of Invention

The object adjustment tool according to the present invention has an effect that it is possible to automatically adjust setting information of objects of already-created screen data.

DESCRIPTION OF EMBODIMENTS

An object adjustment tool and an object adjustment program according to an embodiment of the present invention are explained in detail below with reference to the drawings. Note that the present invention is not limited by this embodiment.

Embodiment

Figure 1:
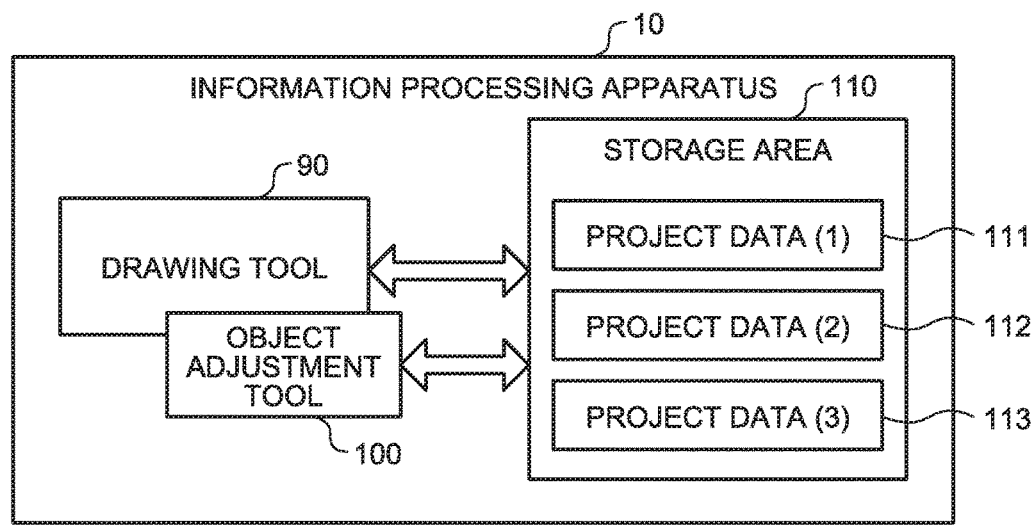
FIG. 1 is a diagram showing a schematic configuration of an information processing apparatus according to an embodiment of the present invention.

FIG. 1 is a diagram showing a schematic configuration of an information processing apparatus 10 according to an embodiment of the present invention. The information processing apparatus 10 is an information processing terminal such as a personal computer. The information processing apparatus 10 includes a drawing tool 90 that supports screen design of a programmable display, an object adjustment tool 100 that automatically adjusts display of objects on a screen, and a storage area 110 that retains project data created using the drawing tool 90. The object adjustment tool 100 can be present as a part of functions of the drawing tool 90. However, the object adjustment tool 100 can be a tool independent from the drawing tool 90.

Project data is data obtained by collecting screen data corresponding to all screens displayed by the programmable display. The storage area 110 shown in FIG. 1 retains project data (1) 111, project data (2) 112, and project data (3) 113.

Figure 2:
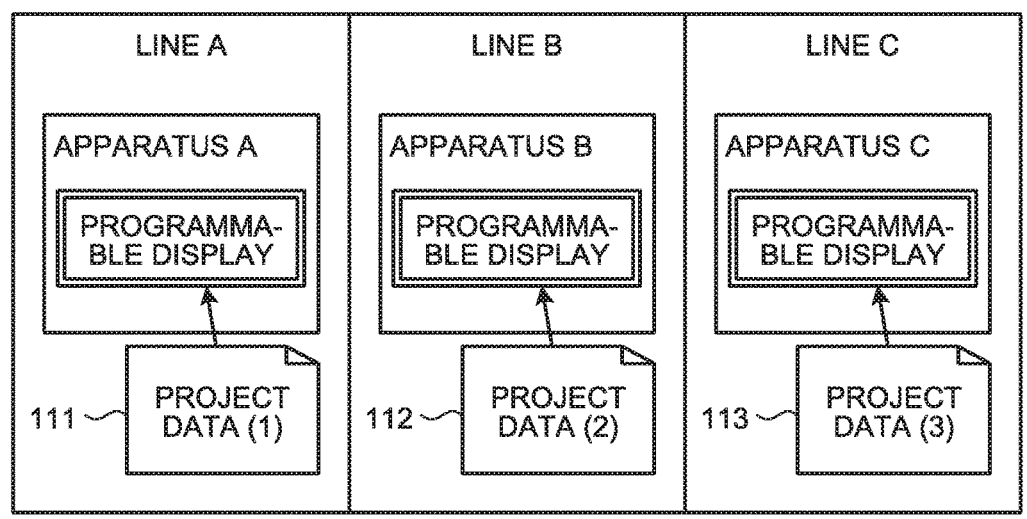
FIG. 2 is a diagram showing a relation between project data and a programmable display according to the embodiment.
Figure 3:
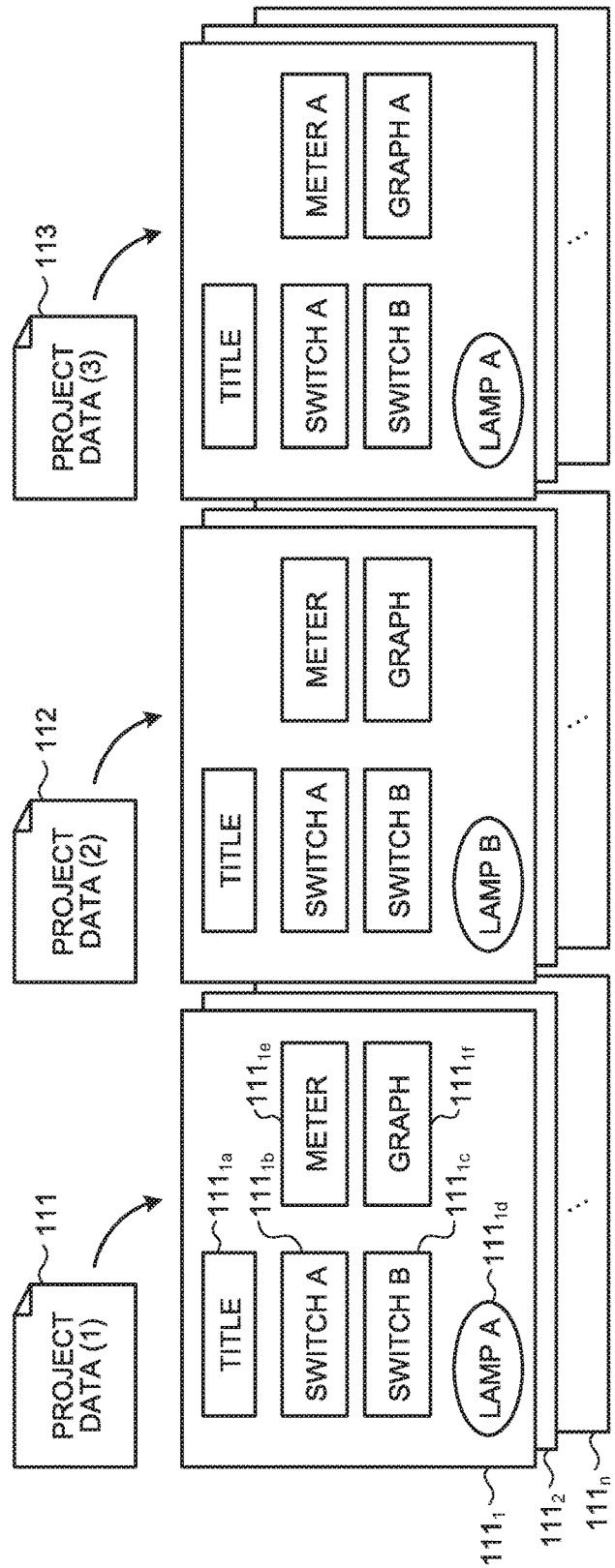
FIG. 3 is a diagram showing an overview of the configuration of the project data according to the embodiment.

FIG. 2 is a diagram showing a relation between the project data and the programmable display according to the embodiment. An apparatus A, an apparatus B, and an apparatus C are control apparatuses such as laser beam machines and are respectively set in a line A, a line B, and a line C separate from one another. The project data (1) 111 is project data of a programmable display of the apparatus A. The project data (2) 112 is project data of a programmable display of the apparatus B. The project data (3) 113 is project data of a programmable display of the apparatus C. The programmable display of the apparatus A displays a screen on the basis of the project data (1) 111. The programmable display of the apparatus B displays a screen on the basis of the project data (2) 112. The programmable display of the apparatus C displays a screen on the basis of the project data (3) 113. FIG. 3 is a diagram showing an overview of the configuration of the project data according to the embodiment. Each of the project data (1) 111, the project data (12) 112, and the project data (3) 113 is configured by a plurality of screen data. A plurality of objects are arranged on screens indicated by the respective screen data. Specifically, the project data (1) 111 includes screen data $111_1$, $111_2$, and $111_n$. The screen data $111_1$ includes objects $111_{1a}$, $111_{1b}$, $111_{1c}$, $111_{1d}$, $111_{1e}$, and $111_{1f}$.

The programmable displays of the apparatus A, the apparatus B, and the apparatus C are connected to the information processing apparatus 10, although not shown in the figure. The project data (1) 111, the project data (2) 112, and the project data (3) 113 after creation are transferred from the information processing apparatus 10 to the programmable displays. The programmable displays display screens on the basis of the project data (1) 111, the project data (2) 112, and the project data (3) 113. However, if means for providing the project data (1) 111, the project data (2) 112, and the project data (3) 113 are separately present in the programmable displays, the respective programmable displays do not always need to be connected to the information processing apparatus 10.

Figure 4:
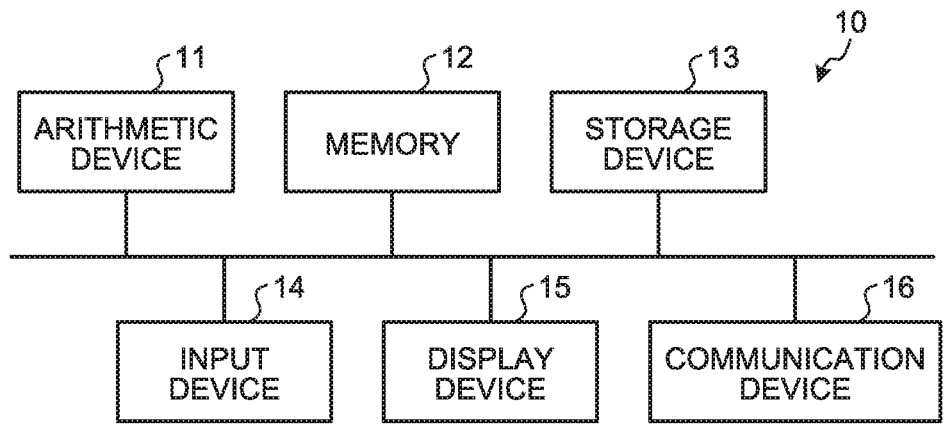
FIG. 4 is a diagram showing a hardware configuration of the information processing apparatus according to the embodiment.

FIG. 4 is a diagram showing a hardware configuration of the information processing apparatus 10 according to the embodiment. The information processing apparatus 10 includes an arithmetic device 11 such as a CPU (Central Processing Unit) that performs arithmetic processing, a memory 12 used by the arithmetic device 11 as a work area, a storage device 13 such as a HDD (Hard Disk Drive) that stores drawing software, an object adjustment program, and project data, an input device 14, which is an input interface between the information processing apparatus 10 and a user, a display device 15 that displays information to the user, and a communication device 16 having a communication function with the programmable display. The drawing software and the object adjustment program are programs executable by a computer such as the information processing apparatus 10.

Functions of the drawing tool 90 are realized by the arithmetic device 11 executing the drawing software. Functions of the object adjustment tool 100 are realized by the arithmetic device 11 executing the object adjustment program. Functions of the storage area 110 are realized by the storage device 13. As explained above, the object adjustment tool 100 can be present as a part of the functions of the drawing tool 90. Therefore, in that case, the object adjustment program is included in the drawing software. The object adjustment program can be present separately from the drawing software and the object adjustment tool 100 can be a tool independent from the drawing tool 90.

Figure 5:
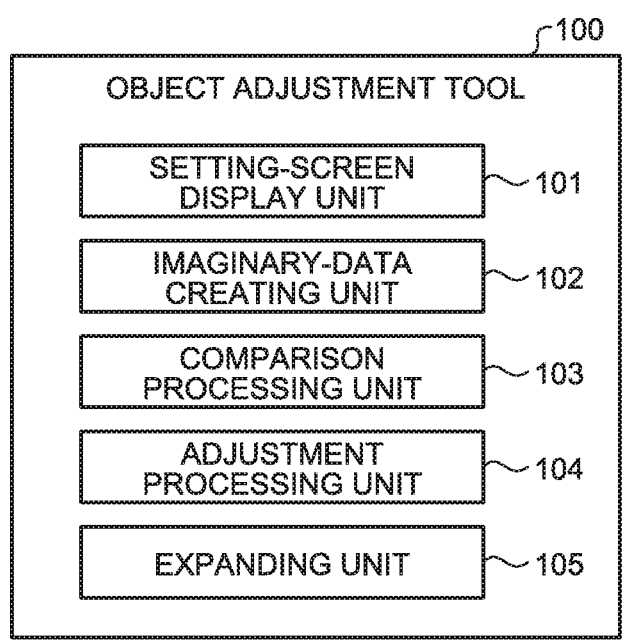
FIG. 5 is a diagram showing a functional configuration of an object adjustment tool according to the embodiment.

FIG. 5 is a diagram showing a functional configuration of the object adjustment tool 100 according to the embodiment. The object adjustment tool 100 includes a setting-screen display unit 101 that causes the display device 15 to display a setting screen, an imaginary-data creating unit 102 that creates imaginary data obtained by collecting project data serving as an adjustment source and an adjustment target, a comparison processing unit 103 that compares objects, an adjustment processing unit 104 that adjusts setting information of an object for which it is determined by the comparison processing unit 103 that adjustment is necessary, and an expanding unit 105 that changes the project data on the basis of the imaginary data.

Figure 6:
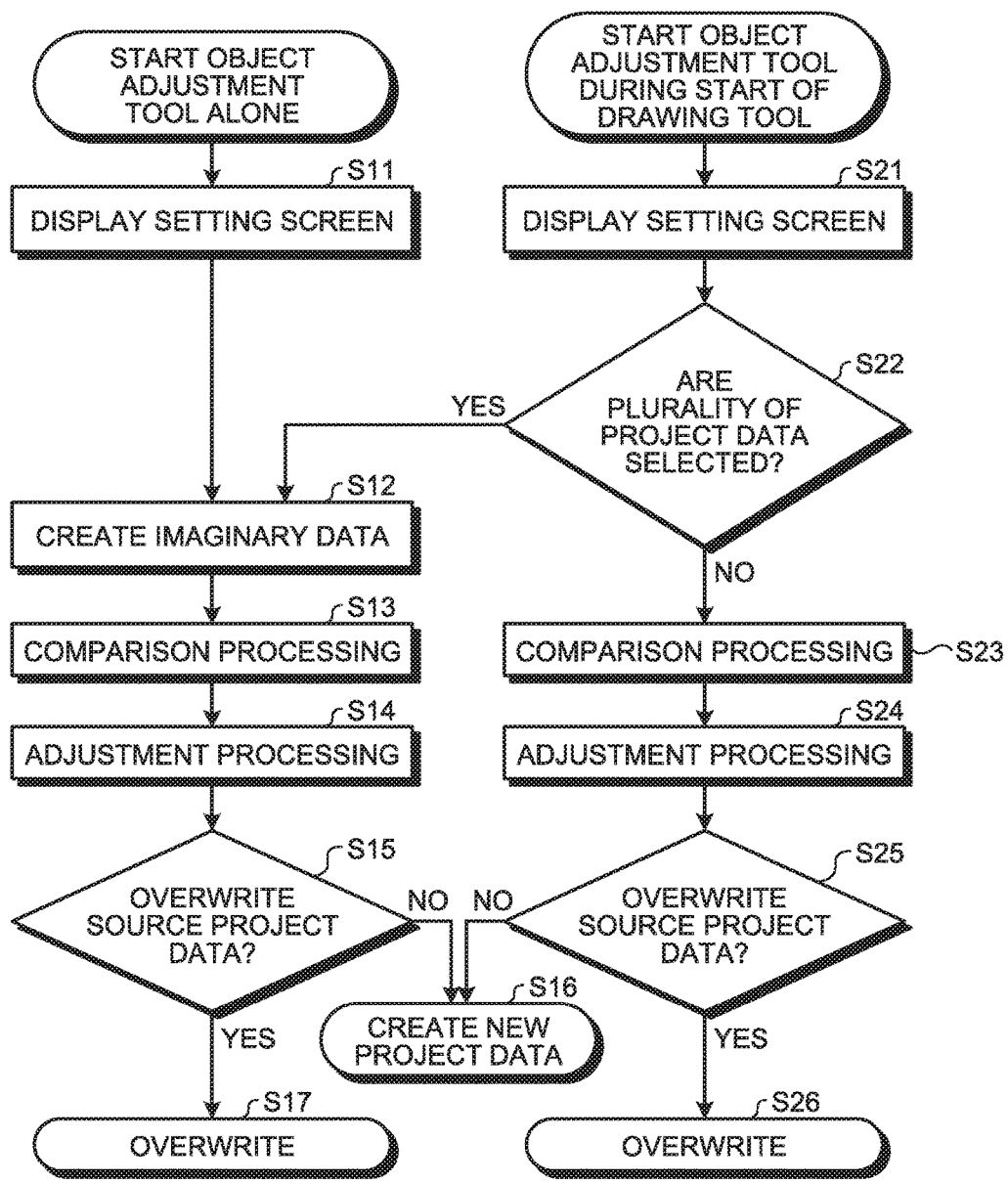
FIG. 6 is a flowchart for explaining the operation of the object adjustment tool according to the embodiment.

FIG. 6 is a flowchart for explaining the operation of the object adjustment tool 100 according to the embodiment. FIG. 6 is a flowchart in which both of a case in which the object adjustment tool 100 is independently started and a case in which the object adjustment tool 100 is started during a start of the drawing tool 90 are assumed.

When the object adjustment tool 100 is independently started, the setting-screen display unit 101 causes the display device 15 to display a setting screen functioning as a user interface (step S11). When the object adjustment tool 100 is started according to an instruction of the user during the start of the drawing tool 90 that opens several project data, the setting-screen display unit 101 also causes the display device 15 to display the setting screen functioning as the user interface (step S21). The instruction of the user during the start of the drawing tool 90 is executed by operation by the user for depressing or selecting an option button on a tool bar displayed on the display device 15.

Figure 7:
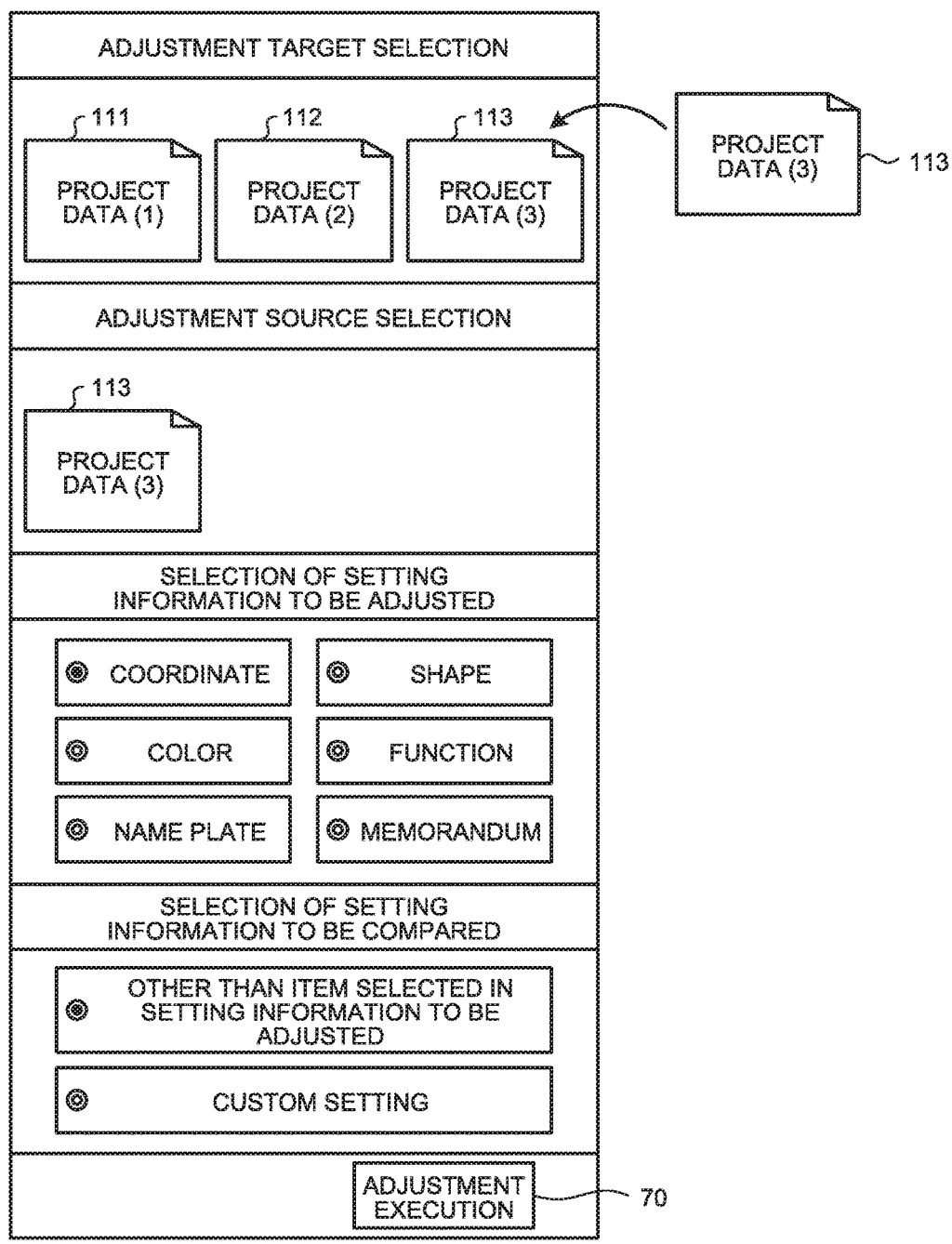
FIG. 7 is a diagram showing an example of a setting screen according to the embodiment.

FIG. 7 is a diagram showing an example of a setting screen according to the embodiment. At steps S11 and S21, the setting-screen display unit 101 displays the setting screen shown in FIG. 7 on the display device 15. The setting screen shown in FIG. 7 includes a field of "adjustment target selection" in which the user designates project data, screen data, or an object serving as an adjustment target, a field of "adjustment source selection" in which the user designates project data, screen data, or an object serving as an adjustment source, a field of "selection of setting information to be adjusted" in which the user selects setting information to be adjusted, a field of "selection of setting information to be compared" in which the user selects setting information to be compared, and an "adjustment execution" button 70.

All of objects included in project data and screen data selected in the field of "adjustment target selection" and objects selected in the field of "adjustment target selection" are referred to as adjustment target objects. All of objects included in project data and screen data selected in the field of "adjustment source selection" and objects selected in the field of "adjustment source selection" are referred to as adjustment source objects. As explained below, not all of the adjustment source objects are references of adjustment of the adjustment target objects. In the following explanation, an object actually serving as a reference of adjustment among the adjustment source objects are referred to as adjustment reference object.

In the example shown in FIG. 7, a state is shown in which the project data (1) 111, the project data (12) 112, and the project data (3) 113 are selected in the field of "adjustment target selection" and the project data (3) 113 is selected in the field of "adjustment source selection". A unit of data selected by the user in the field of "adjustment target selection" and the field of "adjustment source selection" is not limited to a project data unit and can be a screen data unit configuring project data or can be an object unit in a screen. In the field of "adjustment target selection", at least one adjustment target object, which is an object serving as a target of adjustment of setting information, is selected. In the field of "adjustment source selection", at least one adjustment reference object, which is an object serving as a reference of adjustment of setting information, is selected. As a method of the selection, a method is conceivable in which the user drags an icon of project data, the user inputs a screen number and designates screen data in the project data, or the user clicks and selects an object.

As a situation in which the user selects objects in the field of "adjustment target selection" and the field of "adjustment source selection", there is a situation in which each of the apparatus A and the apparatus B is operating in a line different from the line C in which the apparatus C is set, the user is creating anew the project data (3) 113 of the programmable display mounted on the apparatus C, and appearance of screens and design of objects by the project data (1) 111 and the project data (2) 112 are improved. By reflecting the appearance of the screens and the design of the objects displayed on the programmable display of the apparatus C on screens of the programmable displays of the apparatus A and the apparatus B, it is possible to obtain unity of an apparatus operation feeling for the operator and efficiency of work in the lines of the apparatus A, the apparatus B, and the apparatus C.

In the field of "selection of setting information to be adjusted" and the field of "selection of setting information to be compared", the user can perform setting of contents to be automatically adjusted and setting for automatically determining objects. An object displayed on the programmable display has setting information such as a "coordinate", a "shape", a "color", a "function", a "name plate", and a "memorandum". The "function" is setting information indicating which of functions such as a switch, a lamp, a meter, and a graph the object has. The "name plate" is text information for displaying "functions" of the object such as a "switch A" and a "lamp A". The "memorandum" is text information not used when the object is displayed such as a comment of an engineer. A background screen itself on which the object is arranged has setting information such as a background color or a pattern. Therefore, the background screen itself can be treated the same as the object and set as a target of comparison processing and adjustment processing explained below.

In the field of "selection of setting information to be adjusted", the user can select, out of the setting information of the object explained above, an item of setting information that the user desires to set as an adjustment target. Specifically, when the user desires to adjust, concerning the same object on different screens, a coordinate of an adjustment target object to be aligned with a coordinate of an adjustment reference object, the user selects an item of a "coordinate" in the field of "selection of setting information to be adjusted". The selection is executed by a method of clicking a button of a "coordinate".

Further, in the field of "selection of setting information to be compared", the user can set setting information serving as an item to be compared by the comparison processing unit 103 that determines whether objects are the same object actually serving as an adjustment target. Specifically, as shown in FIG. 7, it is possible to select "other than an item selected in setting information to be adjusted" and "custom setting".

When the "other than an item selected in setting information to be adjusted" is selected, an item other than an item of setting information selected in the field of "selection of setting information to be adjusted" is an item of setting information serving as a target of comparison. Specifically, when the "coordinate" is selected in the field of "selection of setting information to be adjusted", the objects are compared concerning the items "shape", "color", "function", "name plate", and "memorandum". By comparing the objects concerning these items, it is possible to determine whether the objects on the different screens are the same object. Specifically, objects, all the items "shape", "color", "function", "name plate", and "memorandum" of which coincide, are regarded as the same object. When the "coordinate" is different, the "coordinate" can be aligned with the "coordinate" of the adjustment source object.

When the "custom setting" is selected, a screen same as the field of "selection of setting information to be adjusted" is displayed on a separate screen such as a popup screen. The user can freely select setting information to be compared. As an example of use of this option, when the "coordinate" is selected in the field of "selection of setting information to be adjusted", the user desires to align the "coordinate" in the objects, all the items "shape", "function", "name plate", and "memorandum" of which coincide, without worrying about a difference in the "color". That is, the user selects the "custom setting" when the user desires to align the "coordinate" of the objects, all the items "shape", "function", "name plate", and "memorandum" of which coincide even if the "coordinate" and the "color" of which are different.

In the "adjustment target selection", the "adjustment source selection", the "selection of setting information to be adjusted", and "selection of setting information to be compared" displayed in the setting screen shown in FIG. 7, after performing designation and selection, the user depresses the "adjustment execution" button 70, whereby automatic adjustment of objects explained below is executed.

When a setting screen is displayed in a situation in which the object adjustment tool 100 is started alone (step S11), when the "adjustment execution" button 70 is depressed, the imaginary-data creating unit 102 creates imaginary data (step S12). Specifically, the imaginary-data creating unit 102 creates, on the memory 12, imaginary data obtained by collecting all project data designated in the field of "adjustment target selection" and the field of "adjustment source selection".

The imaginary-data creating unit 102 has a function of creating imaginary data anew on the memory 12 and integrating all of a plurality of screen data of project data serving as an adjustment source and an adjustment target and setting information of objects in a screen. That is, the imaginary data is data including setting information of all adjustment source objects including an adjustment reference object and setting information of all adjustment target objects. A purpose of the imaginary-data creating unit 102 creating the imaginary data is to, when adjustment of project data is carried out without starting the drawing tool 90, make it possible to realize comparison and adjustment throughout a plurality of project data without opening the project data, that is, without expanding the project data on the memory 12.

Figure 8:
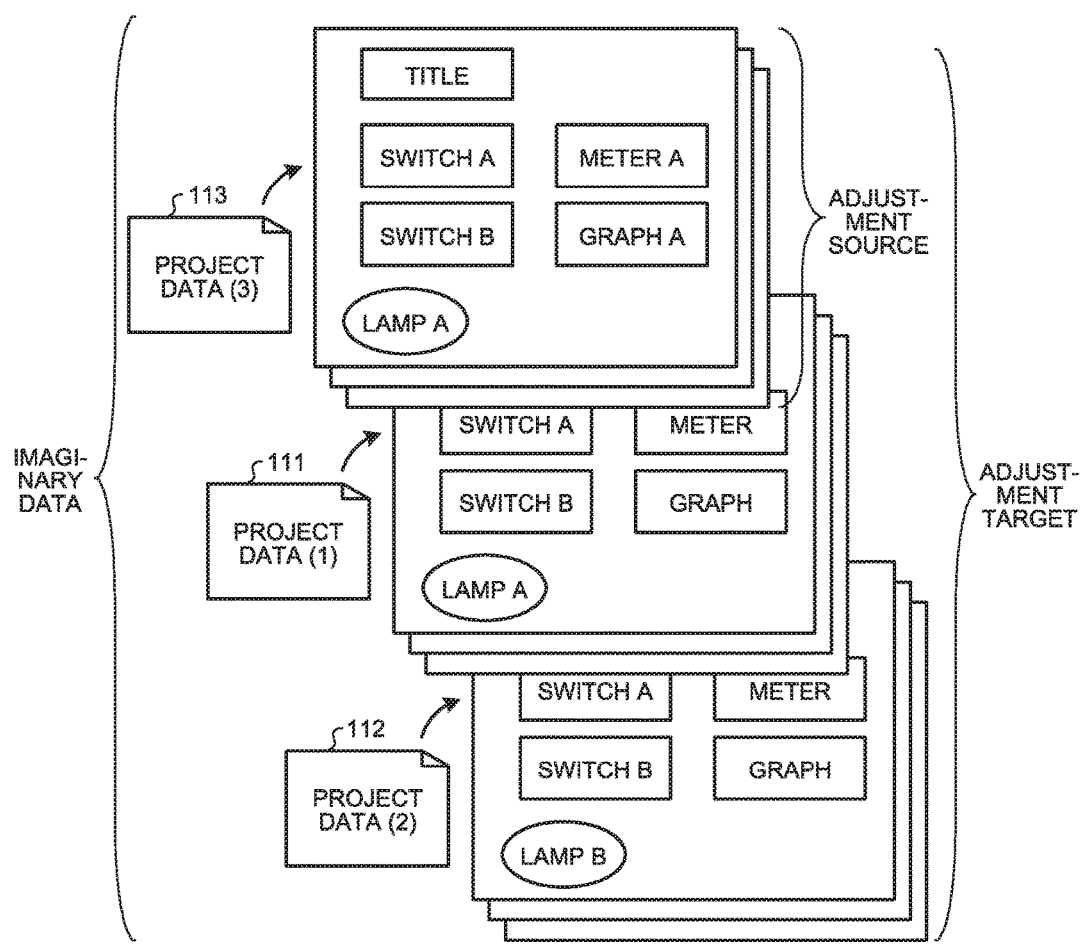
FIG. 8 is a diagram showing an example of imaginary data according to the embodiment.

FIG. 8 is a diagram showing an example of imaginary data according to this embodiment. The project data (1) 111, the project data (2) 112, and the project data (3) 113 are selected in the field of "adjustment target selection" and the project data (3) 113 is selected in the field of "adjustment source selection". Therefore, data obtained by collecting the project data (1) 111, the project data (2) 112, and the project data (3) 113 is imaginary data. FIG. 8 shows imaginary data at the time when a plurality of project data are selected in the field of "adjustment target selection" and the field of "adjustment source selection" shown in FIG. 7. However, when the object adjustment tool 100 is started alone, imaginary data is created even if only one project data is selected in the field of "adjustment target selection" and the field of "adjustment source selection". Specifically, when one project data is designated in the field of "adjustment target selection" and one screen data in the project data is designated in the field of "adjustment source selection", the one project data is created as imaginary data. Comparison processing (step S13) and adjustment processing (step S14) after step S12 are executed on imaginary data on the memory 12.

When the setting screen is displayed in a situation in which the object adjustment tool 100 is started during the start of the drawing tool 90 (step S21), when the "adjustment execution" button 70 is depressed, the imaginary-data creating unit 102 determines whether a plurality of project data are selected in the field of "adjustment target selection" and the field of "adjustment source selection" of the setting screen shown in FIG. 7 (step S22). When a plurality of project data are selected (Yes at step S22), the imaginary-data creating unit 102 proceeds to step S12 and creates imaginary data obtained by collecting the project data on the memory 12. Otherwise, that is, when only one project data is selected (No at step S22), the imaginary-data creating unit 102 proceeds to step S23. When the only one project data is selected at step S22, the selected project data is already expanded on the memory 12 according to the start of the drawing tool 90. Therefore, the comparison processing (step S23) and the adjustment processing (step S24) after step S22 are executed on the project data expanded on the memory 12.

The comparison processing at step S13 and step S23 is executed by the comparison processing unit 103. In the comparison processing, the comparison processing unit 103 determines whether it is necessary to adjust setting information of an object included in the project data or the screen data designated in the field of "adjustment target selection", that is, an adjustment target object by comparing the object with an adjustment reference object. The adjustment reference object is included in an adjustment source object, which is an object included in project data or screen data designated in the field of "adjustment source selection". Regarding setting information to be compared, an item selected by the user in the field of "selection of setting information to be compared" is processed. The comparison processing at step S13 is executed on the imaginary data on the memory 12. The comparison processing at step S23 is executed on the project data expanded on the memory 12. However, processing contents of the comparison processing at step S13 and the comparison processing at step S23 are the same.

Figure 9:
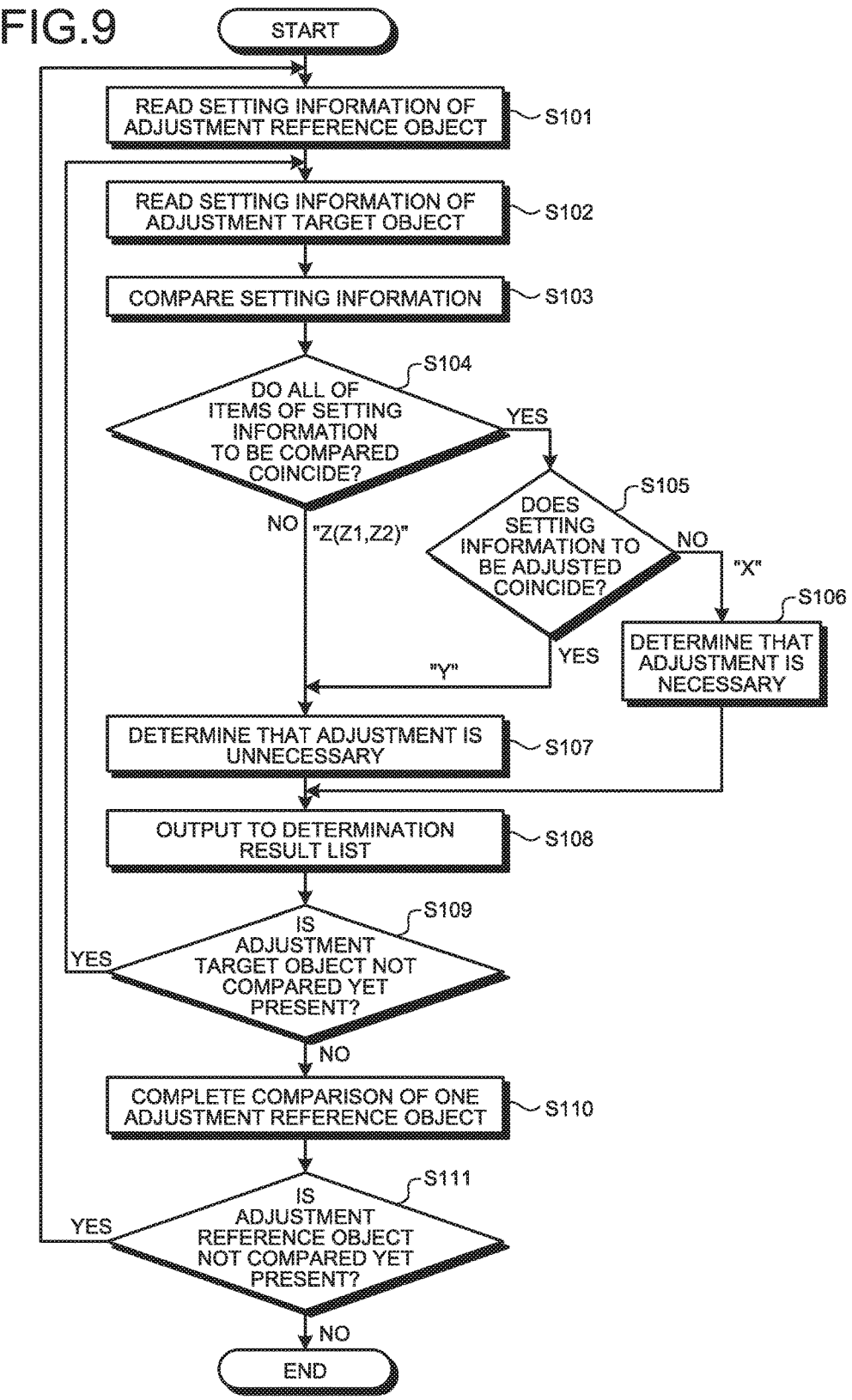
FIG. 9 is a flowchart for explaining comparison processing executed by a comparison processing unit according to the embodiment.
Figure 10:
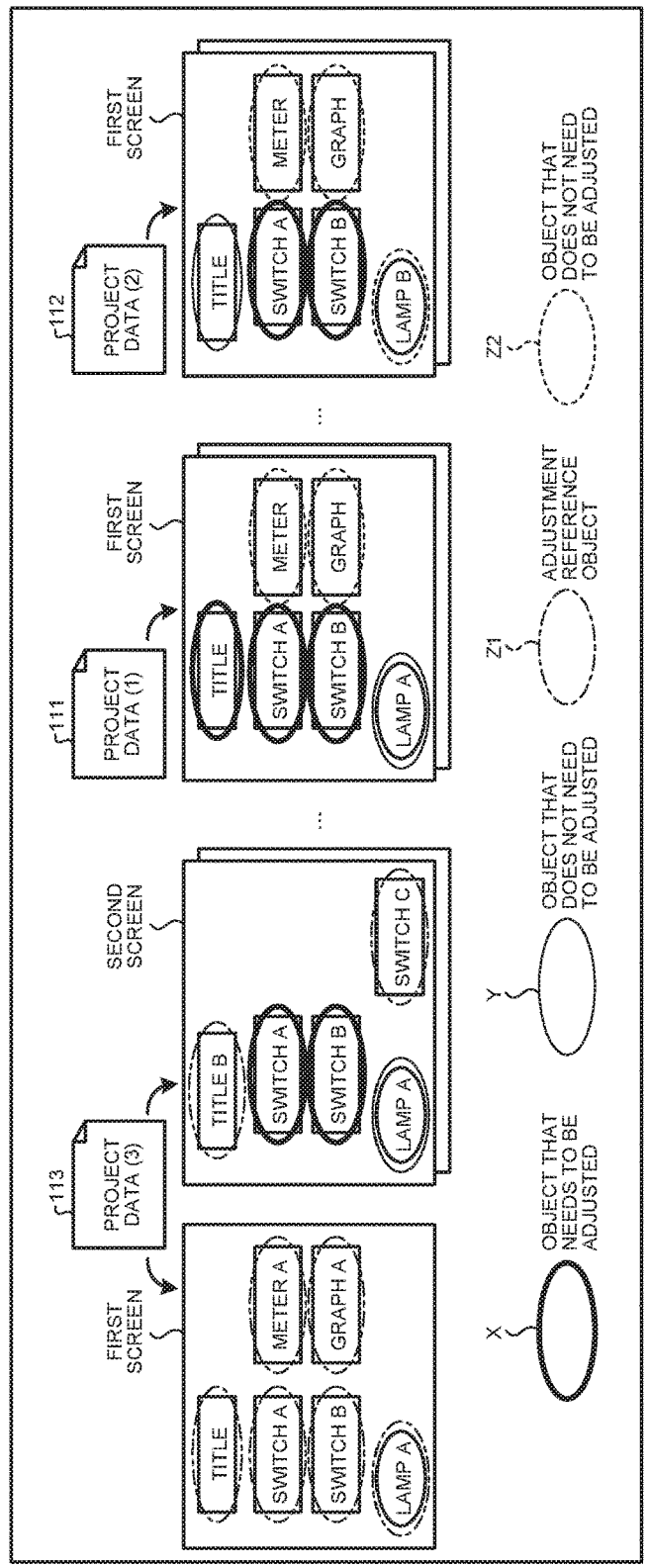
FIG. 10 is a diagram showing a state of comparison of objects in the comparison processing according to the embodiment.

In the following explanation, comparison processing executed on objects in the imaginary data shown in FIG. 8 in the state of the setting screen shown in FIG. 7 is explained. FIG. 9 is a flowchart for explaining the comparison processing executed by the comparison processing unit 103 according to the embodiment. An operation entity in the flowchart is the comparison processing unit 103. FIG. 10 is a diagram showing a state of comparison of objects in the comparison processing according to the embodiment. In the state of the setting screen shown in FIG. 7, the project data (3) 113 is selected in both of the field of "adjustment target selection" and the field of "adjustment source selection". In such a case, not all of objects included in the project data (3) 113, that is, not all of adjustment source objects are references of adjustment of an adjustment target object. An object actually serving as a reference of adjustment is an adjustment reference object.

First, the comparison processing unit 103 reads setting information of an adjustment reference object, which is an object that should be actually set as a reference of adjustment, among adjustment source objects, which are objects designated in the field of "adjustment source selection" (step S101). Because the project data (3) 113 is selected as an adjustment source in FIG. 7, all of objects of a first screen of the project data (3) 113 shown in FIG. 10 are adjustment reference objects. Therefore, specifically, setting information of a "title", which is a first object of the first screen of the project data (3) 113 is read first. Order of objects in one screen only has to be decided on the basis of references such as coordinates of positions where the objects are displayed and functions.

Subsequently, the comparison processing unit 103 reads setting information of an object designated in the field of "adjustment target selection", that is, an adjustment target object (step S102). The project data (3) 113 is selected as the adjustment target as well in FIG. 7. However, as explained above, not all of the objects of the first screen of the project data (3) 113 are not adjustment target objects because the objects are adjustment reference object. Therefore, setting information of a "title B", which is a first object of a second screen of the project data (3) 113 shown in FIG. 10, is read first. That is, all of objects included in the second screen and subsequent screens of the project data (3) 113 are treated as adjustment target objects first.

Subsequently, concerning setting information set in the field of "selection of setting information to be compared", the comparison processing unit 103 compares an adjustment reference object and an adjustment target object (step S103). Specifically, when the "coordinate" is selected in the field of "selection of setting information to be adjusted" and the "other than an item selected in setting information to be adjusted" is selected, the items of "shape", "color", "function", "name plate", and "memorandum" of the adjustment reference object and the adjustment target object are compared.

Thereafter, the comparison processing unit 103 determines whether all the compared items of the setting information coincide (step S104). At step S104, the comparison processing unit 103 determines whether the adjustment reference object and the adjustment target object can be regarded as the same object. When all the items coincide (Yes at step S104), the comparison processing unit 103 regards the adjustment reference object and the adjustment target object as the same object and determines whether the setting information to be adjusted selected in the field of "selection of setting information to be adjusted" coincides between both the objects (step S105).

When the setting information to be adjusted does not coincide at step S105 (No at step S105), specifically, when the adjustment target object is the same as the adjustment reference object but the "coordinate" is different between both the objects, the comparison processing unit 103 determines that adjustment concerning the "coordinate" is necessary (step S106). The adjustment target object for which it is determined that adjustment is necessary in this way is labeled as "X".

When the setting information to be adjusted coincides at step S105 (Yes at step S105), specifically, the adjustment target object is the same as the adjustment reference object and the "coordinate" coincides between both the objects, the comparison processing unit 103 determines that the adjustment concerning the "coordinate" is unnecessary (step S107). The adjustment target object that is same as the adjustment reference object and for which it is determined that adjustment is unnecessary in this way is labeled as "Y".

When not all of the compared items of the setting information coincide at step S104 (No at step S104), the comparison processing unit 103 determines that the adjustment reference object and the adjustment target object are not the same and are different objects and determines that the adjustment concerning the "coordinate" is unnecessary (step S107). The adjustment target object that is different from the adjustment reference object and for which it is determined that adjustment is unnecessary in this way is labeled as "Z". There are two types as the object labeled as "Z". When the adjustment target object labeled as "Z" is also an adjustment source object, because the adjustment target object serves as an adjustment reference object anew, the adjustment target object is further labeled as "Z1". When the adjustment target object labeled as "Z" is not an adjustment source object, because the adjustment target object is only an object for which adjustment is unnecessary, the adjustment target object is further labeled as "Z2".

A specific example of the labeling in the comparison processing explained above is explained with reference to FIG. 10.

When a "title" of the first screen of the project data (3) 113, which is a specific example of step S101, is set as an adjustment reference object and a "title B" of the second screen of the project data (3) 113, which is a specific example of step S102, is set as an adjustment target object, because the "name plate" is different in the "title" and the "title B", it is determined "No" at step S104 and the "title B" is labeled as "Z". Further, because the "title B" of the second screen of the project data (3) 113 is also an adjustment source object, the "title B" serves as an adjustment reference object anew and is labeled as "Z1". A "switch C" of the second screen of the project data (3) 113 is also "Z1". Thereafter, in third and subsequent screens of the project data (3) 113, objects of the project data (1) 111 and the project data (2) 112 are set as adjustment target objects and comparison is performed using adjustment reference objects including the objects determined as the adjustment reference objects anew.

When the "title" of the first screen of the project data (3) 113 is set as an adjustment reference object and when a "title" of a first screen of the project data (1) 111 is set as an adjustment target object, all the items of the setting information compared at step S104 coincide. However, because the "coordinate" is different between both the objects, it is determined "No" at step S105. The "title" of the first screen of the project data (1) 111 is labeled as "X". A "switch A" and a "switch B" of the first screen of the project data (1) 111 are also "X".

When the "title" of the first screen of the project data (3) 113 is set as an adjustment reference object and a "title" of a first screen of the project data (2) 112 is set as an adjustment target object, because all the items of the setting information compared at step S104 coincide and the "coordinate" is the same between both the objects, it is determined "Yes" at step S105. The "title" of the first screen of the project data (2) 112 is labeled as "Y". A "lamp A" of the first screen of the project data (1) 111 is also "Y".

When a "meter A" of the first screen of the project data (3) 113 is set as an adjustment reference object and a "meter" of the first screen of the project data (1) 111 is set as an adjustment target object, because the "name plate" is different in the "meter A" and the "meter", it is determined "No" at step S104 and the "meter" is labeled as "Z". Further, because the "meter" of the first screen of the project data (1) 111 is not an adjustment source object, the "meter" is labeled as "Z2". A "graph" of the first screen of the project data (1) 111 is also "Z2".

The project data (3) 113 is selected in both of the field of "adjustment target selection" and the field of "adjustment source selection". Therefore, when the project data (3) 113 includes a plurality of screen data, comparison is carried out in the ascending order of screen numbers. As explained above, all the objects of the first screen of the project data (3) 113 are the adjustment reference objects. Therefore, on the second and subsequence screens of the project data (3) 113, the objects of the project data (1) 111 and the project data (2) 112 are set as adjustment target objects and comparison is performed.

In the above explanation, the comparison processing is explained as the comparison of the objects in the imaginary data shown in FIG. 8. However, the same applies when objects of project data expanded on the memory 12 are compared. When a plurality of same screen data are selected in both of the field of "adjustment target selection" and the field of "adjustment source selection", a first screen in the screen data only has to be treated the same as the first screen of the project data (3) 113.

After step S106 and step S107, the comparison processing unit 103 outputs association of the labels "X", "Y", "Z1", or "Z2" with the adjustment target objects to the determination result list on the memory 12 as a determination result based on the comparison (step S108). In the determination result list, classification of the labels "X", "Y", "Z1", or "Z2" for the adjustment target objects does not always have to be described. However, contents of the determination results at step S104 and step S105 are included in the determination result list. The determination result list is saved on the memory 12 and is overwritten when the comparison processing is repeated. In the determination result list, setting information to be adjusted of the adjustment reference object serving as the reference of the comparison at step S105 is also associated with the object for which it is determined that adjustment is necessary and to which "X" is affixed. That is, the "coordinate" of the adjustment reference object is also associated with the object that is different from the adjustment reference object in the "coordinate" and to which "X" is affixed.

After step S108, the comparison processing unit 103 determines presence or absence of an adjustment target object not compared yet (step S109). When an adjustment target object not compared yet is present (Yes at step S109), at step S102, the comparison processing unit 103 reads setting information of the next adjustment target object. When an adjustment target object not compared yet is absent (No at step S109), the comparison processing unit 103 completes the comparison of one adjustment reference object, the setting information of which is read in S101 (step S110).

After step S110, the comparison processing unit 103 determines presence or absence of an adjustment reference object not compared yet (step S111). When an adjustment reference object not compared yet is present (Yes at step S111), at step S101, the comparison processing unit 103 reads setting information of the next adjustment reference object. When an adjustment reference object not compared yet is absent (No at step S111), the comparison processing unit 103 ends the comparison processing.

When the comparison processing at step S13 or step S23 shown in FIG. 6 ends, the adjustment processing unit 104 executes the adjustment processing at step S14 or step S24. The adjustment processing at step S14 and the adjustment processing at step S24 are processing having the same content and are only different in whether an adjustment target is imaginary data on the memory 12 or project data, which is a set of screen data including an adjustment target object expanded on the memory 12.

In the adjustment processing, the adjustment processing unit 104 adjusts, on the basis of contents at the end of the comparison processing of the determination result list continuously overwritten at step S108 shown in FIG. 9, setting information of an adjustment target object labeled as "X" to be the same as setting information of an adjustment reference object compared with the adjustment target object when the adjustment target object is labeled as "X". That is, the adjustment processing unit 104 adjusts the setting information to be adjusted of the adjustment target object to coincide with the setting information to be adjusted of the adjustment reference object.

Specifically, the setting information to be adjusted of the adjustment reference object associated with the adjustment target object labeled as "X" in the determination result list is copied to the setting information of the adjustment target object. If the setting information to be adjusted is the "coordinate", the "coordinate" of the adjustment reference object is copied to the "coordinate" of the adjustment target object labeled as "X". Consequently, it is possible to automatically adjust the "coordinate" of an adjustment target object, which is the same as the adjustment reference object but the "coordinate" of which is different from the "coordinate" of the adjustment reference object, to be the "coordinate" of the adjustment reference object.

After step S14, the expanding unit 105 determines whether one or a plurality of project data serving as sources of the imaginary data are overwritten with content of the imaginary data after the adjustment (step S15). The determination of the overwriting can be performed on the basis of an instruction of the user at the time when an option screen is displayed on the display device 15 after the execution of the adjustment processing at step S14. The determination of the overwriting can be performed on the basis of an instruction of the user at the time when adjustment content is displayed on the display device 15 as a difference from imaginary data when project data serving as a source of the imaginary data is opened during the start of the object adjustment tool 100. When determining that the source project data is overwritten (Yes at step S15), the expanding unit 105 overwrites one or a plurality of project data serving as sources of the imaginary data with the content of the imaginary data after the adjustment in the storage area 110 (step S17). That is, the expanding unit 105 overwrites screen data including an adjustment target object with the content of the imaginary data after the adjustment such that setting information to be adjusted of the adjustment target object is setting information to be adjusted of an adjustment reference object. When not determining that the source project data is overwritten (No at step S15), the expanding unit 105 creates new project data on the basis of the content of the imaginary data after the adjustment in the storage area 110 while changing a file name (step S16). Note that, although not described in the flowchart of FIG. 6, an option for stopping the adjustment without reflecting the content of the imaginary data after the adjustment can be prepared.

After step S24, the expanding unit 105 determines whether the project data retained in the storage area 110 is overwritten with the content after the adjustment of the project data including the adjustment target object expanded on the memory 12 (step S25). The determination of the overwriting can be performed on the basis of an instruction of the user at the time when the option screen is displayed on the display device 15 after the execution of the adjustment processing at step S24. When determining that the project data is overwritten (Yes at step S25), the expanding unit 105 overwrites the project data with the content after the adjustment in the storage area 110 (step S26). That is, the expanding unit 105 overwrites screen data including an adjustment target object with the content after the adjustment such that setting information to be adjusted of the adjustment target object is setting information to be adjusted of an adjustment reference object. When not determining that the project data is overwritten (No at step S25), the expanding unit 105 creates new project data in storage area 110 on the basis of the content after the adjustment while changing a file name (step S16). An option for stopping the adjustment without reflecting the content of the imaginary data after the adjustment can be prepared.

As explained above, with the object adjustment tool 100 and the object adjustment program according to the embodiment of the present invention, by preparing the user interface like the setting screen shown in FIG. 7, the user can set, at a high degree of freedom, setting information that the user desires to adjust concerning an object and a range of an adjustment target. After the setting, according to the setting by the user, the object adjustment tool 100 automatically extracts an object that should be adjusted and adjusts setting information of the object. That is, it is possible to efficiently execute, on setting information of an object of already-created screen data, automatic adjustment with content intended by the user.

The object adjustment tool 100 according to the embodiment can automatically execute a check of a slight positional deviation, a difference of a figure, or the like due to an individual difference that occurs when the operator creates screen data of the programmable display and automatically adjust the slight positional deviation, the difference of the figure, or the like. Therefore, it is possible to greatly save labor and time for the creation of the screen data and the check after the creation. The setting information of the object can be compared and changed in a transverse manner among a plurality of screen data and among a plurality of project data. Therefore, it is possible to perform parallel adjustment for the screen data and the project data. Consequently, it is possible greatly reduce work man-hour for checking and correcting the screen data and the project data. It is possible to greatly reduce a work time in creation and correction of screen data.

Note that, in the above explanation, the object adjustment tool 100 and the object adjustment program according to the embodiment are explained concerning the objects included in the screen data of the programmable display. However, the target of the object adjustment tool 100 according to the embodiment is not limited to the objects included in the screen data of the programmable display. That is, the object adjustment tool 100 is also applicable to objects included in screen data other than the screen data of the programmable display. Specifically, the object adjustment tool according to the embodiment can be applied to the same object used in a plurality of pages of software for presentation including a plurality of screen data such as power point (registered trademark) to adjust setting information.

The configuration explained in the embodiment indicates an example of the content of the present invention and can be combined with other publicly-known technologies or a part of the configuration can be omitted or changed in a range not departing from the spirit of the present invention.

REFERENCE SIGNS LIST 10 information processing apparatus
11 arithmetic device
12 memory
13 storage device
14 input device
15 display device
16 communication device
70 "adjustment execution" button
90 drawing tool
100 object adjustment tool
101 setting-screen display unit
102 imaginary-data creating unit
103 comparison processing unit
104 adjustment processing unit
105 expanding unit
110 storage area
111 project data (1)
$111_1$, $111_2$, $111_n$ screen data
$111_1$, $111_{1b}$, $111_{1c}$, $111_{1d}$, $111_{1e}$, $111_{1f}$ object
112 project data (2)
113 project data (3)

The invention claimed is:

1. An information processing apparatus comprising an object adjustment tool comprising:
a memory to store a plurality of pieces of screen data that are received from a plurality of apparatuses, each of the plurality of pieces of screen data comprising a same graphic object;
a setting-screen monitor to display a setting screen to designate an adjustment target object, and an adjustment reference object among the graphic objects that are respectively included in the plurality of pieces of screen data, and to receive setting information of the adjustment target object and setting information of the adjustment reference object;
a comparison processor to determine whether the setting information of the adjustment reference object matches the setting information of the adjustment target object;
an adjustment processor to adjust the setting information of the adjustment target object to match with the setting information of the adjustment reference object, in response to determining that the setting information of the adjustment reference object does not match the setting information of the adjustment target object; and
an expander to overwrite the screen data including the adjustment target object with the adjusted setting information of the adjustment target object,
wherein, when the setting-screen monitor sets a type of the setting information to a screen coordinate of the graphic object, the comparison processor determines whether a screen coordinate of the adjustment reference object matches a screen coordinate of the adjustment target object, and the adjustment processor adjusts the screen coordinate of the adjustment target object to match with the screen coordinate of the adjustment reference object in response to determining that the screen coordinate of the adjustment reference object does not match the screen of the adjustment target object.

2. The information processing apparatus according to claim 1, further comprising an imaginary-data creator to create imaginary data including setting information of the adjustment target object and setting information of the adjustment reference object, wherein
the comparison by the comparison processor and the adjustment by the adjustment processor are executed on the imaginary data.

3. The information processing apparatus according to claim 1, wherein, when the screen data including the adjustment target object is expanded on the memory, the comparison by the comparison processor and the adjustment by the adjustment processor are executed on the memory.

4. A non-transitory computer readable medium storing an object adjustment program for causing a computer to execute:
- a step of storing a plurality of pieces of screen data that are received from a plurality of apparatuses, each of the plurality of pieces of screen data comprising a same graphic object
- a step of displaying a setting screen to designate an adjustment target object and an adjustment reference object among the graphic objects that are respectively included in the plurality of pieces of screen data, and to receive setting information of the of the adjustment target object and setting information of the adjustment reference object;
- a step of determining whether the setting information of the adjustment reference object matches the setting information of the adjustment target object;
- a step of adjusting, in response to determining that the setting information of the adjustment reference object does not match the setting information of the adjustment target object, the setting information of the adjustment target object to match with the setting information of the adjustment reference object; and
- a step of overwriting the screen data including the adjustment target object with the adjusted setting information of the adjustment target object,
- wherein, when a type of the setting information is set to a screen coordinate of the graphic object, the determining step comprises determining whether a screen coordinate of the adjustment reference object matches a screen coordinate of the adjustment target object, and the adjusting step comprises adjusting the screen coordinate of the adjustment target object to match with the screen coordinate of the adjustment reference object, in response to determining that the screen coordinate of the adjustment reference object does not match the screen of the adjustment target object.

5. The non-transitory computer readable medium according to claim 4, further comprising a step of creating imaginary data including the setting information of the adjustment target object and the setting information of the adjustment reference object, wherein
the determining step and the adjusting step are executed on the imaginary data.

6. The non-transitory computer readable medium according to claim 4, wherein, when the screen data including the adjustment target object is expanded on a memory, the determining step and the adjusting step are executed on the memory.

* * * * *